Nov. 26, 1957 A. W. STURMAN 2,814,305
VALVE FOR WATER CLOSETS
Filed Oct. 11, 1955 3 Sheets-Sheet 1
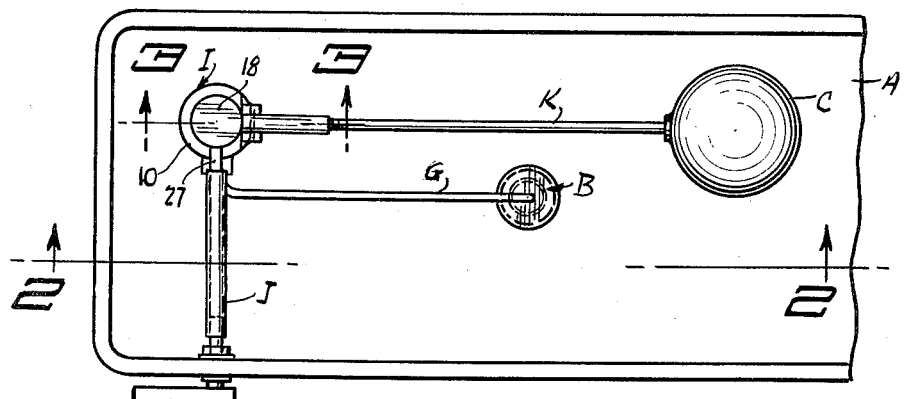
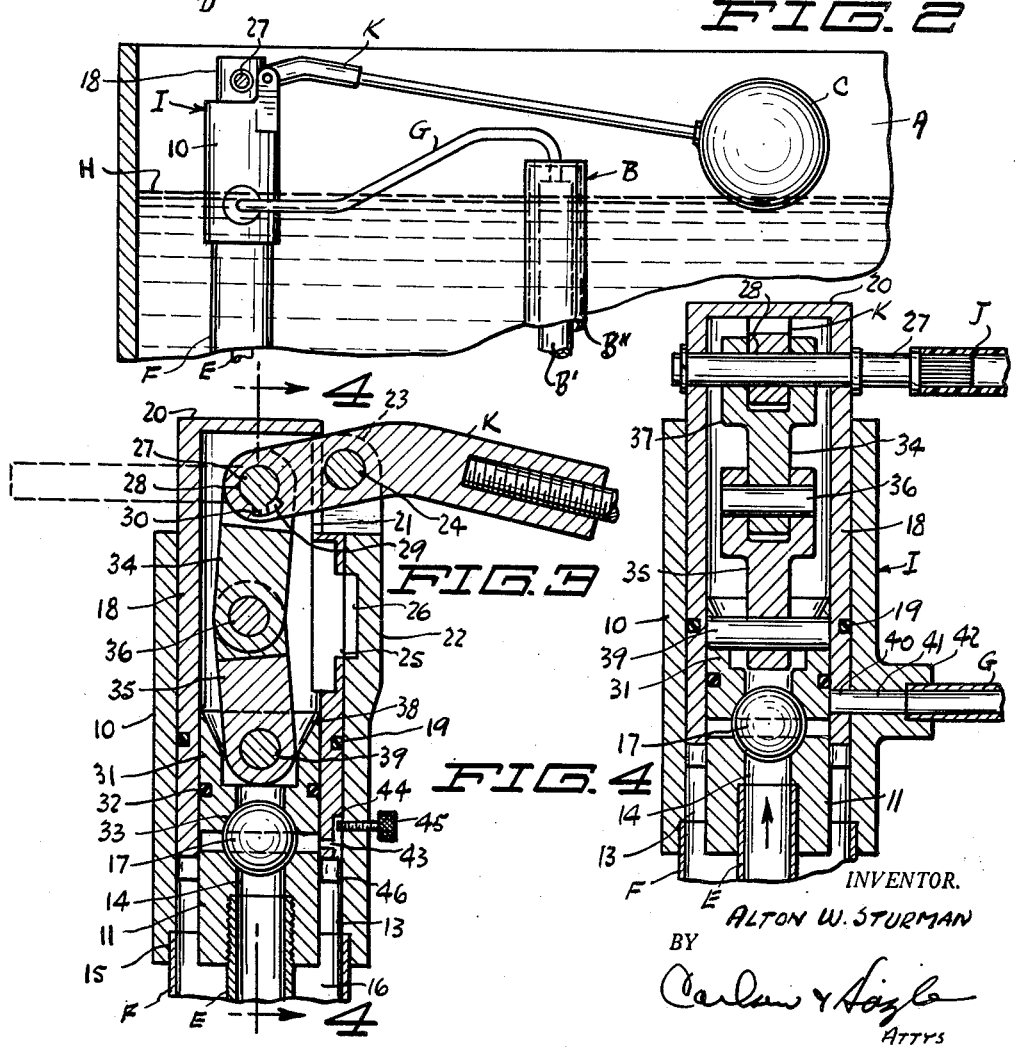
INVENTOR.
ALTON W. STURMAN
BY
*Carlson & Hogle*
ATTYS

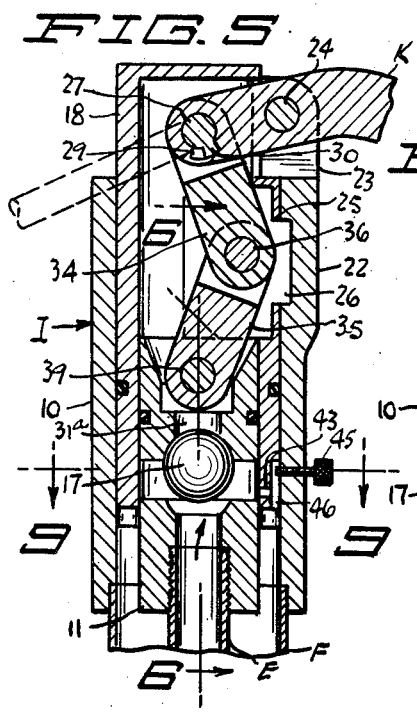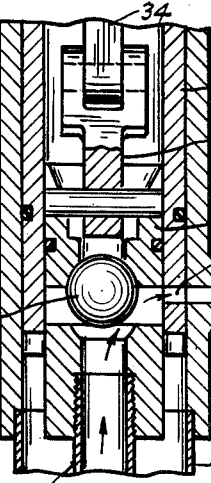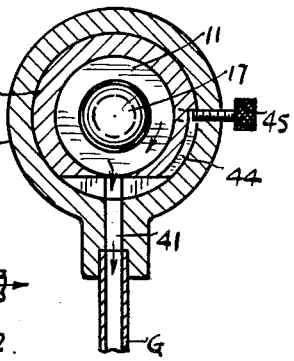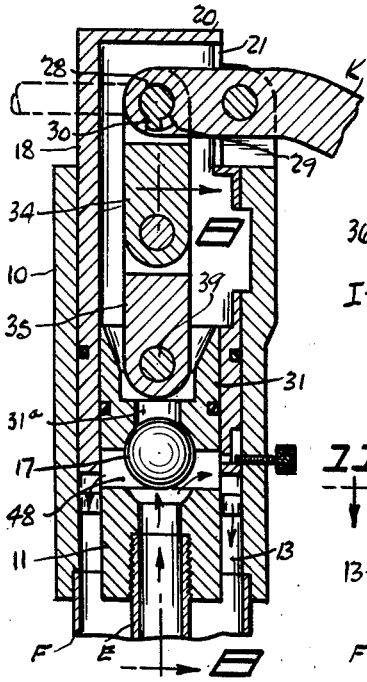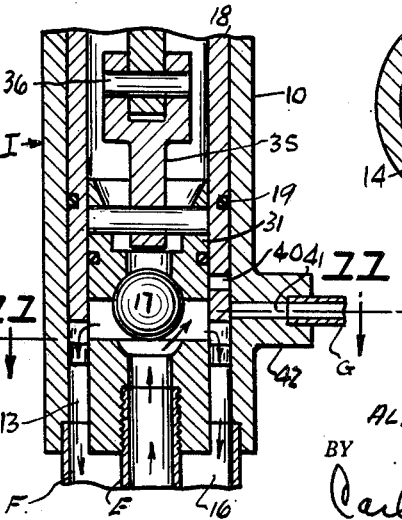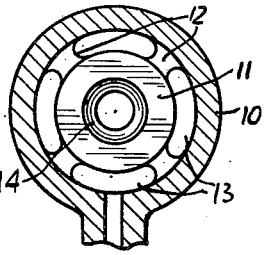

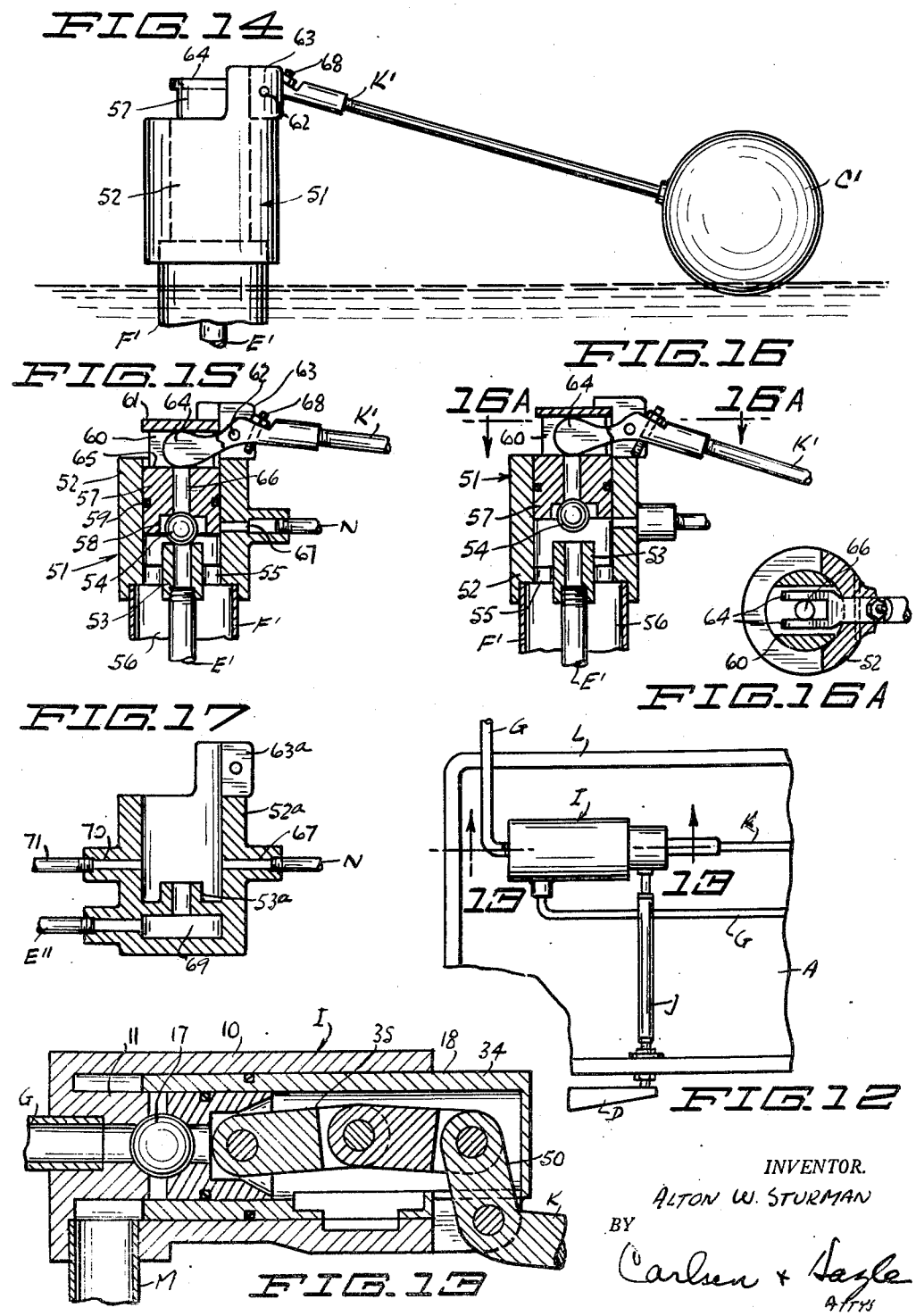

United States Patent Office 2,814,305
Patented Nov. 26, 1957

2,814,305

VALVE FOR WATER CLOSETS

Alton W. Sturman, Minneapolis, Minn.

Application October 11, 1955, Serial No. 539,719

13 Claims. (Cl. 137—410).

My invention relates to improvements in valves for initiating the flushing action of water closets and then refilling the tank with water for the next flushing action. Continued trouble-free operation of such valves has long been sought and it is a primary object of my invention to provide a valve which will solve this problem.

Another object is to provide a valve suited to use with siphonic flushing water closets such as disclosed in my co-pending application Serial No. 374,055, filed August 13, 1953, now Patent No. 2,783,475 granted March 5, 1957, or in my Patent No. 2,700,163, issued January 25, 1955, and which is particularly suited to such usage but which also may be used as the hand and float controlled valve in the more ordinary flushing system.

Still another object is to provide a valve of this nature which is simple and inexpensive in construction and assembly, but positive, long wearing and completely trouble-free in its operation. The valve is also adaptable to socalled over the rim mounting of the water inlet pipe as is required by the ordinances in some cities and operates with equal facility in such installations.

These and other more detailed and specific objects will be disclosed in the course of the following specification, reference being had to the accompanying drawings, in which—

Fig. 1 is a partial plan view of the water tank of a water closet as fitted with my valve and showing the associated piping and other elements.

Fig. 2 is a fragmentary vertical sectional view along the line 2—2 in Fig. 1.

Fig. 3 is an enlarged vertical sectional view of the valve in its normal or starting position.

Fig. 4 is a section along the line 4—4 in Fig. 3.

Fig. 5 is a view similar to Fig. 3 but showing the valve parts tripped to initiate the flushing action.

Fig. 6 is a fragmentary vertical section substantially along the line 6—6 in Fig. 5.

Fig. 7 is a sectional view like Figs. 3 and 5 but showing the valve parts in the positions assumed as the float has descended during the flushing operation.

Fig. 8 is a fragmentary sectional view along the line 8—8 in Fig. 7.

Fig. 9 is a horizontal section on the line 9—9 in Fig. 5.

Fig. 10 is a fragmentary sectional view of the valve housing, viewing the valve sleeve therein in elevation.

Fig. 11 is a horizontal section on the line 11—11 in Fig. 8.

Fig. 12 is a fragmentary plan view of a water closet tank with an over the rim installation of the flushing system and with my valve laid over horizontally.

Fig. 13 is an enlarged longitudinal section on the line 13—13 in Fig. 12.

Fig. 14 is an elevational view of a modified form of valve embodying the principles of my present invention but as adapted to present day flushing systems.

Figs. 15 and 16 are sectional views of this form of valve in closed and opened positions respectively.

Fig. 17 is a sectional view of a valve housing for a valve like that of Figs. 14–16 but adapted to over the rim installation where this is required.

Referring now more particularly and by reference characters to the drawing, my invention as seen in Figs. 1 through 11 thereof, is adapted for installation in the tank A of a water closet which has a siphonic flushing mechanism B having two spaced apart members B' and B" similar to that of my previous application and patent previously identified, leading through the usual trap to the bowl (neither here shown), a float C and a flushing handle D. Extending upward through the bottom of the tank A is a water supply pipe E here shown as surrounded by a larger pipe F which is open at its lower end to the interior of the tank. The mechanism B is of the type in which the flushing action is induced by the supply of a small amount of water through a tube G which water entrains and carries out entrapped air and causes the water in the tank, normally standing at about the level H, to flow out through the flushing mechanism to the bowl. As this occurs, and this action is brought about as will later appear by the usual manipulation of the handle D, the float C descends and on completion of the flushing action the tank is refilled, as is also the siphonic flushing mechanism ready for the next operation, the float C of course ascending as the water level in the tank again rises. The valve of my invention is designated generally at I, and is mounted atop the pipes E and F, partially above the normal water level H, and the handle D is connected to operate the valve through a slip fit connection J so constructed that while rotation thereof by the handle will operate the valve the inner end of the connection J may also move upward and downward a short distance without binding. A lever or lever element K connects the float C to the valve I, as will also be set forth.

Turning now to the construction of the valve per se the same comprises a hollow housing 10 in the lower end of which is a stationary valve seat 11 joined to the interior of the housing wall by spaced fins 12 (Fig. 11) forming intervening openings 13 from above the valve seat out through the lower end of the housing. The seat 11 has a central axial opening 14 tapped in its lower portion to screw upon the threaded upper end of the supply pipe E and thus not only support the valve as a whole but supply water through said opening 14. The pipe F and housing 10 could, of course, be cast or formed as a unit. The pipe F is pressed at 15 into the lower end of the housing 10 and the openings 13 communicate with the annular space 16 between the pipes, and with the tank A, of course. The upper end of opening 14 is formed to seat a valve ball 17 of "nylon" or other suitable material and when this ball is seated no water can flow from pipe E.

Slidable within the housing 10 is a generally cylindrical sleeve or sleeve element 18 and an O ring 19 provides a water seal above the lower end of the sleeve. The internal diameter of this sleeve 18 is such that in its lowermost position (Figs. 3 and 4) its lower end will slip over the upper edge of the valve seat 11. At this point it may be noted that the terms "lower"—"upper" are here used merely for convenience since the valve will operate as well in a horizontal or angular position and is, in fact, shown in the former in Figs. 12 and 13. The upper end of the sleeve 18 is closed at 20 but cut away at one side 21 to provide an opening clearing the end of the float lever element K. At this same side the housing 10 is slightly bulged at 22 and provided with upstanding apertured lugs 23 through which a pin 24 is passed for fulcruming the lever element K to the housing. Also at this same side the sleeve 18 is open at 25 and the interior of the housing is recessed at 26 to clear the toggle linkage presently to be described. It will further be noted that the upper end portion of the sleeve 18 projects above the housing 10 and a rod 27 forming the innermost element of the aforesaid flushing handle connection J is journaled through this exposed upper part of the sleeve, and also through an opening 28 in the extremity of float lever element K. Said opening 28 has a radially enlarged recess 29 in which plays a lug 30 in said rod 27 forming a lost motion connection as will be apparent.

Axially slidable within the lower part of the sleeve 18 is a valve seater or valve ball seating element 31 having an O ring seal 32 with the interior of the sleeve. Normally the valve seater 31, as it will hereinafter for simplicity be called, is lowered to the position of Figs. 3–4 in which its curved seat face 33 bears against the valve ball 17 holding the same closed against the seat 11. The valve seater is positioned by toggle linkage made up of upper and lower links 34—35 pivoted together by a pin 36 at their adjacent ends. The upper end of the upper link 34 is forked at 37 and fixed to the aforesaid rod 27 on opposite sides of the lever element K (Fig. 4) while the lower end of the lower link 35 extends into a hollow 38 in the valve seater 31 and is pivoted thereto by a pin 39. In the normal, or starting, position of the valve the toggle links 34—35 are just past dead center as seen in Fig. 3 and they act to hold the valve ball 17 seated as will be apparent.

A short distance above the level of the valve seat 11 a port 40 is formed in the sleeve 18 and registers with a port 41 opening through a boss 42 on the housing 10 which is connected to the siphon starting tube G. The port 40 is normally covered by the valve seater 31 (Fig. 4). Also formed through the wall of the sleeve 18 is a small opening 43 and the same communicates through a shallow groove 44 in the exterior of the sleeve with the port 41, a metering screw 45 threaded through the housing wall and into said groove metering the rate of water flow therethrough. Attention is called to the fact that the groove 44 also opens at 46 through the lower end of the sleeve 18 (Figs. 3 and 5) for a purpose presently to appear. Solely for convenience in illustration of the valve the port 41 is shown as angularly displaced about the axis of the valve from beneath the lever element K. In actual practice, to facilitate machining and manufacture, this would not be the case and the bulge 22, lever element K, boss 42 and metering screw 45 would all be arranged in line vertically. The groove 44 extends vertically some distance where the metering screw 45 projects inwardly, to permit upward and downward movement of the sleeve 18.

In operation from its starting or normal position the valve is first tripped by moving the flushing handle D to rotate rod 27 in a counterclockwise direction from the position of Fig. 3 to that of Fig. 5. This jackknifes the toggle links 34—35 but does not move lever arm K due to the lost motion connection 29—30 and the links are moved to the position of Fig. 5 raising the valve seater 31 and permitting the valve ball 17 to move upward off seat 11, which it does under influence of the water pressure, which forces the ball into the curved face 33 where it remains. As the valve seater 31 rises it uncovers the port 40 (Fig. 6) and water will then flow as indicated through tube G to start the siphonic flushing action. Immediately the water level in the tank A begins to fall, the float C begins to descend and lever element K turns clockwise about its fulcrum 24, toward the position of Figs. 7 and 8. This action straightens the toggle links 34—35, returning them to their past dead center starting position and at the same time lifts the sleeve 18. The latter action moves port 40 out of registry with port 41 to shut off the flow of siphon starting water but the valve ball 17 remains off its seat 11, of course, and water from the supply pipe E may then flow down through the openings 13 and space 16 into the water tank. This refilling flow is at a rate much less than that of the water flowing from the tank to flush the bowl, of course, and once the water has flushed from the tank then the latter begins to refill and the float C starts upward again, marking the completion of the flushing action. As the float ascends the lever element K turns counterclockwise about its fulcrum pin 24 and since the toggle links are now straightened out the result is to force the sleeve 18 downward until, as the valve ball 17 is forced to its seat 11, the water flow into the tank has been completed and the supply pipe E is sealed off at the valve seat. The mechanism is then ready for the next flushing operation. It will be noted that seater 31 has an axial opening 31ª normally closed by the ball 17 when the valve is opened but if the water fails the ball will drop, air may enter through opening 31ª and the same thus functions as an anti-syphoning device for the valve.

The space between the tubes B'—B" is refilled as the tank is refilled and in addition the opening 43 and groove 44 provides a metered volume of additional water to refill the trap, the amount of which water is controlled by the position of metering screw 45. This trap refilling may or may not be required depending on circumstances. Also it will be noted that as the valve ball 17 approaches its seat, as the tank is being refilled the groove 46 provides for the continuous escape of water, from the zone 48 (Fig. 7) just above the seat 11 to the interior of the tank until the ball is actually seated and thus there can be no entrapment of water in this zone by the descending valve seater 31 and ball such as would build up back pressure and preventing proper closing of the valve.

In some municipalities ordinances require what is called an over the rim arrangement of the water supply pipe for water closets and in Figs. 12 and 13 I have illustrated my valve as adapted to such installations. The water supply pipe E in this case is shown as extending inward over the top rim L of the tank A and then bent to fit into the valve I which is arranged horizontally rather than vertically as heretofore described. In lieu of the pipe F a tank filling pipe M (Fig. 13) is fitted into the valve housing 10 to receive water from the valve seat 11 when the valve ball 17 is off the seat. Aside from the formation of lever element K with an angularly bent lever arm 50 to fit the valve in this position the construction and operation is the same as previously described and should need no further elaboration herein.

The principles of my invention are also applicable to present day widely used flushing mechanisms wherein the flushing handle actuates a valve ball which allows the water to escape from the tank into the bowl, and a valve to be controlled by the float C for such use is shown in Figs. 14 et seq. In Figs. 14–16ª this valve is designated generally at 51 and is mounted atop pipes E' and F' corresponding to the pipes E and F of the earlier description herein. The valve comprises a hollow housing 52 having a stationary valve seat 53 in its lower end, adapted to be normally closed by a valve ball 54. When the valve ball is off the seat then water may flow downward through openings 55 around the seat and through the space 56 between the pipes E' and F' into the tank (not here shown). A valve seater or valve ball seating element 57 is slidable in the bore of the valve housing 52 and has a recess 58 in its lower end accommodating the valve ball 54. An O ring 59 seals the valve seater and the latter extends upwardly through the open upper end of the valve housing 52 whereat the exposed end of this element 57 is transversely slotted at 60 to receive the forked, cam end 61 of a float lever element K' connected to the float C'. This element K' is fulcrumed by a pin 62 between ears 63 on the upper edge of the valve housing and it will be noted that the top 64 of the valve seater is closed so that the cam end of the lever element K' bears between this closed end and adjacent face 65 of the seater element. In the starting or normal position, with the tank full, the ball 54 is held down to its seat 53 but when the bowl is flushed and the float C' descends lever element K' fulcrums clockwise about its fulcrum pin to lift seater element 57 and allow the valve ball to open as seen in Fig. 16. As the tank refills the reverse action takes place and the ascending ball cams and levers the seater and ball back downwardly until the valve is closed.

An axial opening 66 is provided in the seater 57, the forked end 64 of the lever element clearing the upper end of this opening for the purpose of acting as an antisyphoning device should the water supply fail, as previously described. When trap filling is deemed desirable a tube N may be provided for this purpose and supplied through a port 67 in the housing wall, which port is uncovered when the valve is opened as seen in Fig. 16. Also it will be noted that an adjustable stop screw 68 is provided in lever element K' to limit downward movement of the float C' and opening movement of the valve so that the vertical movement of the seater element 57 can be regulated thus controlling the rate of flow of inlet water.

For an over the rim mounting of a valve of this kind only the valve housing need be altered as seen in Fig. 17. Here the housing 52ᵃ has a valve seat 53ᵃ below which is a chamber 69 into which a water supply pipe E'' may be tapped from the side. When the valve is opened then tank refilling water may emerge through a lateral port 70 and pipe 71 opposite the aforesaid port 67 in a manner readily understandable. Of course, in this instance there are no openings corresponding to those at 55 from top to bottom of the valve seat.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A valve for a water closet flushing mechanism which includes a water tank, a flushing handle, a float and a water supply pipe, said valve comprising a valve seat communicating with the water supply pipe, a valve ball normally closed against the seat, a valve housing, a valve ball seating element located wholly within and movable within the housing and engaging the valve ball opposite said seat, and means operative by both the handle and float for positioning said valve ball seating element.

2. A valve for a water closet flushing mechanism which includes a water tank, a flushing handle, a float and a water supply pipe, said valve comprising a valve seat communicating with the water supply pipe, a valve ball normally closed against the seat, a valve housing, a valve ball seating element movable up and down within the housing above the valve ball, and means operative by the handle to move said valve ball seating element to enable the valve ball to leave its seat and means operative by the float to position the said element and return the ball to its seat.

3. A water closet valve for a water closet having a water tank, a flushing mechanism, a water supply pipe, a flushing handle and a float, the said valve comprising a housing, a stationary valve seat in the housing communicating with the supply pipe, a valve ball, a valve ball seating element slidable in the housing above the ball valve and normally holding said valve ball to the seat, a water tank refill means communicating with the valve seat when the ball is off its seat, means operative by said handle for moving the valve ball seating element to a position permitting water pressure from the supply pipe to move the valve ball off its seat, and means operative by the float to reposition the valve ball seating element to seat the ball against the valve seat.

4. A water closet valve for a water closet having a water tank, a flushing mechanism, a water supply pipe, a flushing handle and a float, the said valve comprising a housing, a stationary valve seat in the housing communicating with the supply pipe, a valve ball, a valve ball seating element slidable within the housing above said valve ball and normally holding said ball to the seat, a water tank refill means communicating with the valve seat when the ball is off its seat, means operative by said handle for moving the valve ball seating element to a position permitting water pressure from the supply pipe to move the valve ball off its seat, means operative by the float to reposition the valve ball seating element to seat the ball against the valve seat, and means providing communicating between the valve seat and the tank as the float moves the valve ball back to its seat to prevent back pressure against the ball such as would prevent the seating thereof.

5. A water closet valve for a water closet having a water tank, a flushing mechanism, a water supply pipe, a flushing handle and a float, the said valve comprising a housing, a stationary valve seat in the housing communicating with the supply pipe, a valve ball, a valve ball seating element slidable within the housing above the ball and normally holding said valve ball to the seat, a water tank refill means communicating with the valve seat when the ball is off its seat, and means including toggle linkage operatively connected between the handle and float for positioning the valve ball seating element with respect to the valve seat.

6. A water closet valve for a water closet having a water tank, a flushing mechanism, a water supply pipe, a flushing handle and a float, the said valve comprising a housing, a stationary valve seat in the housing communicating with the supply pipe, a valve ball, a valve ball seating element slidable in the housing and normally holding said valve ball to the seat, a water tank refill means communicating with the valve seat when the ball is off its seat, and means including toggle linkage operatively connected between the handle and float for positioning the valve ball seating element with respect to the valve seat, said last mentioned means including a lost motion connection between the handle and the toggle linkage.

7. A water closet valve for a water closet having a water tank, a flushing mechanism, a water supply pipe, a flushing handle and a float, the said valve comprising a housing, a cylindrical valve sleeve slidable in the housing and a lever element connecting the float to said sleeve to axially position the latter responsive to the level of water in the tank, a stationary valve seat in the housing communicating with the water supply pipe, a valve ball normally closed against said seat, a valve ball seating element axially slidable within said sleeve and normally engaging and seating said ball against the seat, and toggle linkage connecting the flushing handle and the said lever element for positioning the valve ball seating element and thereby controlling the seating of the ball.

8. A water closet valve for a water closet having a water tank, a flushing mechanism, a water supply pipe, a flushing handle and a float, the said valve comprising a housing, a cylindrical valve sleeve slidable in the housing and a lever element connecting the float to said sleeve to axially position the latter responsive to the level of water in the tank, a stationary valve seat in the housing communicating with the water supply pipe, a valve ball normally closed against said seat, a valve ball seating element axially slidable within said sleeve and normally engaging and seating said ball against the seat, toggle links connecting the lever element and the valve ball seating element and normally holding the latter in position to firmly seat the ball, means operative by the flushing handle to jackknife the toggle links and move the seating element away from the seat and thereby permit the valve ball to clear the seat, the said lever element having a fulcrum connection to the valve housing whereby as the float descends the toggle links will be straightened out to re-seat the valve ball.

9. A water closet valve for a water closet having a water tank, a siphonic, water started flushing mechanism, a water supply pipe for the tank, a flushing handle and a float; the said valve comprising a housing, a cylindrical valve sleeve axially slidable in the housing and a lever element connecting the float to said sleeve to axially position the latter responsive to the level of water in the tank, a stationary valve seat in the housing communicating with the water supply pipe, a valve ball normally closed against said seat, a valve ball seating element axially slidable within said sleeve and normally engaging and seating said ball against the seat, toggle links connecting the lever element and the valve ball seating element and normally holding the latter in position to firmly seat the ball, means operative by the flushing handle to jackknife the toggle links and move the seating element away from the seat and thereby permit the valve ball to clear the seat, the housing having a port exposed to the valve seat as the said element moves away from the seat to supply water to start the flushing mechanism, the said lever element having a fulcrum connection to the valve housing whereby as the float descends the toggle links will be straightened out to re-seat the valve ball but the sleeve will be moved axially away from the seat to permit the ball to remain off its seat while closing the said port, means for supplying water from the seat to refill the tank, and the said lever element being operative as the float then ascends to return the sleeve and the seating element toward the seat and close the valve ball thereagainst.

10. A water closet valve for a water closet having a water tank, a siphonic, water started flushing mechanism connected to a trap, a water supply pipe for the tank, a flushing handle and a float; the said valve comprising a housing, a cylindrical valve sleeve axially slidable in the housing and a lever element connecting the float to said sleeve to axially position the latter responsive to the level of water in the tank, a stationary valve seat in the housing communicating with the water supply pipe, a valve ball normally closed against said seat, a valve ball seating element axially slidable within said sleeve and normally engaging and seating said ball against the seat, toggle links connecting the lever element and the valve ball seating element and normally holding the latter in position to firmly seat the ball, means operative by the flushing handle to jackknife the toggle links and move the seating element away from the seat and thereby permit the valve ball to clear the seat, the housing having a port exposed to the valve seat as the said element moves away from the seat and a tube extending from the port to supply water to start the flushing mechanism, the said lever element having a fulcrum connection to the valve housing whereby as the float descends the toggle links will be straightened out to re-seat the valve ball but the sleeve will be moved axially away from the seat to permit the ball to remain off its seat while closing the said port, means for supplying water from the seat to refill the tank, the said lever element being operative as the float then ascends to finally return the sleeve and the seating element toward the seat and close the valve ball thereagainst ready for another flushing operation, and means for supplying a metered volume of water through the port and tube to the flushing mechanism for refilling the trap.

11. A water closet valve for a water closet having a water tank, a siphonic, water started flushing mechanism, a water supply pipe for the tank, a flushing handle and a float; the said valve comprising a housing, a cylindrical valve sleeve axially slidable in the housing and a lever element connecting the float to said sleeve to axially position the latter responsive to the level of water in the tank, a stationary valve seat in the housing communicating with the water supply pipe, a valve ball normally closed against said seat, a valve ball seating element axially slidable within said sleeve and normally engaging and seating said ball against the seat, toggle links connecting the lever element and the valve ball seating element and normally holding the latter in position to firmly seat the ball, means operative by the flushing handle to jackknife the toggle links and move the seating element away from the seat and thereby permit the valve ball to clear the seat, the housing having a port exposed as the said element moves away from the valve seat to supply water to start the flushing mechanism, the said lever element having a fulcrum connection to the valve housing whereby as the float descends the toggle links will be straightened out to re-seat the valve ball but the sleeve will be moved axially away from the seat to permit the ball to remain off its seat while closing the said port, means for supplying water from the seat to refill the tank, the said lever element being operative as the float then ascends to return the sleeve and the seating element toward the seat and close the valve ball thereagainst, and means on the sleeve providing communication between the tank and the seat until the ball actually reaches the seat to prevent trapping water and building up back pressure against the valve ball.

12. A water closet valve for a water closet having a water tank, a siphonic, water started flushing mechanism, a water supply pipe for the tank, a flushing handle and a float; the said valve comprising a housing, a cylindrical valve sleeve axially slidable in the housing and a lever element connecting the float to said sleeve to axially position the latter responsive to the level of water in the tank, a stationary valve seat in the housing communicating with the water supply pipe, a valve ball normally closed against said seat, a valve ball seating element axially slidable within said sleeve and normally engaging and seating said ball against the seat, toggle links connecting the lever element and the valve ball seating element and normally holding the latter in position to firmly seat the ball, means operative by the flushing handle to jackknife the toggle links and move the seating element away from the seat and thereby permit the valve ball to clear the seat, the housing having a port exposed as the said element moves away from the valve seat to supply water to start the flushing mechanism, the said lever element having a fulcrum connection to the valve housing and lost motion connection to the links whereby as the float descends the toggle links will be straightened out to re-seat the valve ball but the sleeve will be moved axially away from the seat to permit the ball to remain off its seat while closing the said port, means for supplying water from the seat to refill the tank, and the said lever element being operative as the float then ascends to return the sleeve and the seating element toward the seat and close the valve ball thereagainst.

13. A water closet valve for a water closet having a water tank, a flushing mechanism, a water supply pipe, a flushing handle and a float, the said valve comprising a housing, a cylindrical valve sleeve slidable in the housing and a lever element connecting the float to said sleeve to axially position the latter responsive to the level of water in the tank, a stationary valve seat in the housing communicating with the water supply pipe, a valve ball normally closed against said seat, a valve ball seating element axially slidable within said sleeve and normally engaging and seating said ball against the seat, means for lifting said seating element to permit the ball to leave its seat, and the valve seating element itself having a seat engaged by the ball as the same is moved off its seat by water rushing therethrough and having an opening communicating with the seat thus engaged by the ball and communicating with the atmosphere to operate as an anti-syphoning device for the valve.

References Cited in the file of this patent

UNITED STATES PATENTS

| | | |
|---|---|---|
| 1,223,170 | Hodgson | Apr. 17, 1917 |
| 1,547,073 | Smith et al. | July 21, 1925 |
| 1,812,774 | Collison | June 30, 1931 |